J. D. KARLE.
BOTTOM STOPPER.
APPLICATION FILED MAY 11, 1916.
1,214,550.
Patented Feb. 6, 1917.
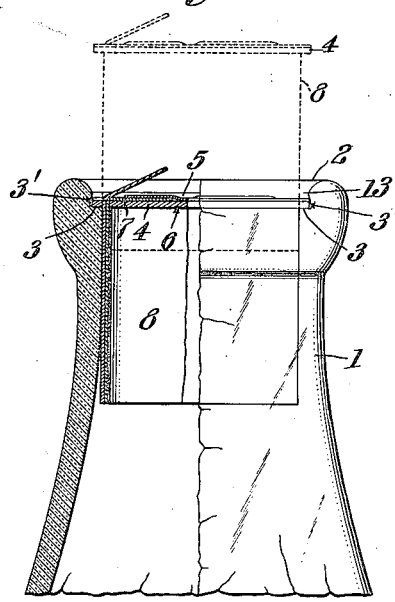
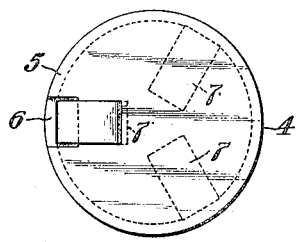
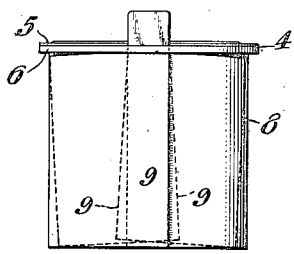
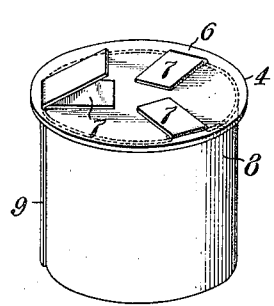
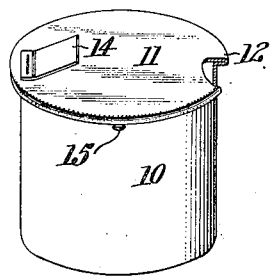
WITNESSES:
L. E. Fischer.
W. P. Stewart
INVENTOR
John D. Karle.
BY
ATTORNEY

UNITED STATES PATENT OFFICE.

JOHN D. KARLE, OF ROSELLE PARK, NEW JERSEY.

BOTTLE-STOPPER.

1,214,550.

Specification of Letters Patent.

Patented Feb. 6, 1917.

Application filed May 11, 1916. Serial No. 96,743.

*To all whom it may concern:*

Be it known that I, JOHN D. KARLE, a citizen of the United States, residing at Roselle Park, in the county of Union and State of New Jersey, have invented certain new and useful Improvements in Bottle-Stoppers, of which the following is a specification, reference being had therein to the accompanying drawings.

This invention relates to improvements in bottle stoppers and has for its principal object to provide a sanitary stopper for that variety of bottles commonly employed in the distribution of milk to consumers.

A further object of the present invention is the providing of a bottle with a stopper which will lessen the liability of freezing of its contents when exposed to a temperature which ordinarily effects a frozen and a consequent expanded condition of the contents, thereby acting to force the ordinary cap or stopper out of engagement with the bottle, thus leaving the frozen milk or cream, or similar substance intended for human consumption, exposed to dirt, germs and uncleanliness incident to visits from cats and dogs, as is commonly experienced in connection with the distribution of such liquids during the colder season of the year, and further, the present improved form of stopper acts, when a change of temperature returns the frozen liquid to its freely flowing condition, to direct the same back into the bottle without loss.

The present invention, in its preferred form, consists of a stopper comprising a disk adapted to be forced into the usual annular L-shaped recess common to the mouths of many forms of bottles, said disk being provided with a tubular portion divided in the direction of its length to better meet the requirements of a freezing temperature and slight variations in the diameters of the openings and which, in practice, extends into the bottle.

The invention will be understood by reference to the accompanying drawings, in which—

Figure 1 is a view in elevation and partly in section of a bottle having one form of the present improved stopper applied thereto. Fig. 2 is a view of the stopper in elevation. Fig. 3 is a bottom plan view of the stopper shown in Fig. 2. Fig. 4 is a top plan view of the disk portion of the stopper. Fig. 5 is a perspective view of the stopper with a portion of the disk removed. Fig. 6 is a perspective view of a modified form of construction of stopper.

Referring to the figures, 1 represents the neck of one form of a commonly employed milk bottle provided with the usual mouth or opening 2 and an annular L-shaped recess or flange comprising a seat 3 for the disk 4 and an annular wall 3' for holding said disk against accidental displacement after having been forced into its seat. The disk preferably comprises two separate plies 5 and 6 suitably secured together and between said plies are secured the lips or extensions as 7 formed with or attached to the tubular portion 8, the lips 7 serving to secure said portion to the disk 4.

The tubular portion 8 is preferably formed of card-board or heavy paper paraffined to resist chemical action, to lower the point of freezing and to make it waterproof. The diameter of the tubular portion 8 corresponds substantially to that of the bottle opening and the free edges thereof, as 9, are slightly overlapping, as shown in Fig. 2.

In the modified form of the invention illustrated in Fig. 6, the stopper is formed from a single piece of card-board comprising a tubular portion 10 closed at its upper end by a disk portion 11 projecting beyond the periphery of the cylinder, thereby providing a flange 12 adapted to fit into the annular L-shaped recess 13 in the mouth of the bottle. The usual lifting lip 14 is suitably secured to said disk and a vent as 15 is provided to permit the escape of air when applying the stopper to a bottle.

From the foregoing it is obvious that the tubular portion may be formed integral with or suitably secured to the disk portion and, accordingly, it is to be understood that the invention is not limited in this respect.

Having thus set forth the nature of the invention, what I claim herein is:—

1. A bottle-stopper comprising a disk adapted to be seated in a recess in the mouth of a bottle and to be unseated by the buckling thereof under the action of the contents of the bottle when freezing, said disk being provided with means for protecting the contents of the bottle when unseated in this manner.

2. A bottle-stopper comprising a disk adapted to be seated in an annular recess in the mouth of a bottle and to be unseated under the action of the contents of the bottle when freezing, said disk including a downwardly projecting tubular portion.

3. A bottle-stopper comprising a disk having a downwardly projecting expansible tubular portion, the diameter of the disk being greater than that of the tubular portion to form a flange adapted to enter an annular recess in the mouth of a bottle.

In testimony whereof, I have signed my name to this specification.

JOHN D. KARLE.